T. H. JACOB.
SUPPLEMENTAL AXLE FOR AUTOMOBILES.
APPLICATION FILED JUNE 8, 1917.

1,278,669.

Patented Sept. 10, 1918.
2 SHEETS—SHEET 1.

Witness:
J. P. Britt

Inventor
T. H. Jacob
By Geo W Young
Attorney

T. H. JACOB.
SUPPLEMENTAL AXLE FOR AUTOMOBILES.
APPLICATION FILED JUNE 8, 1917.
1,278,669.
Patented Sept. 10, 1918.
2 SHEETS—SHEET 2.
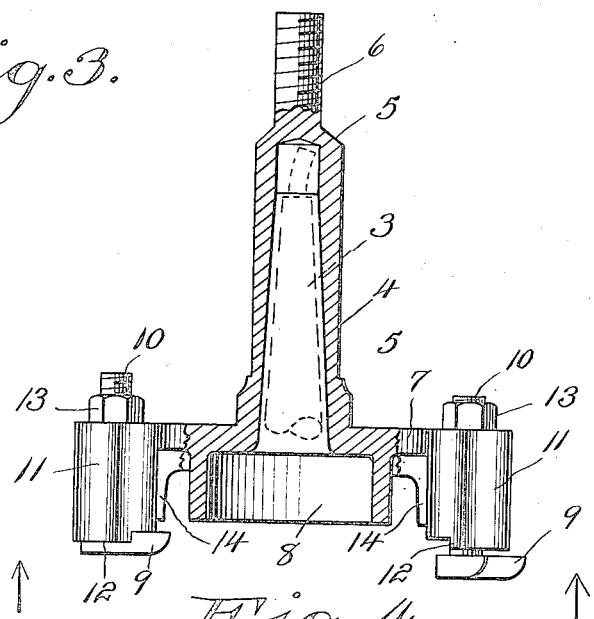
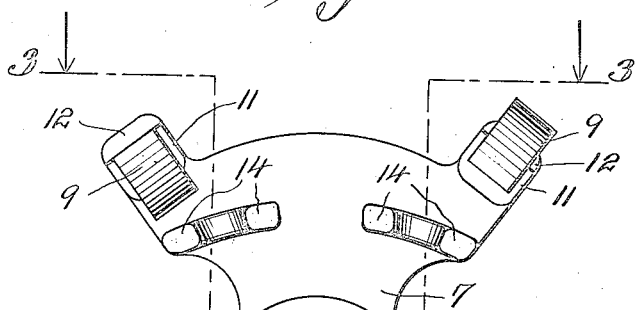
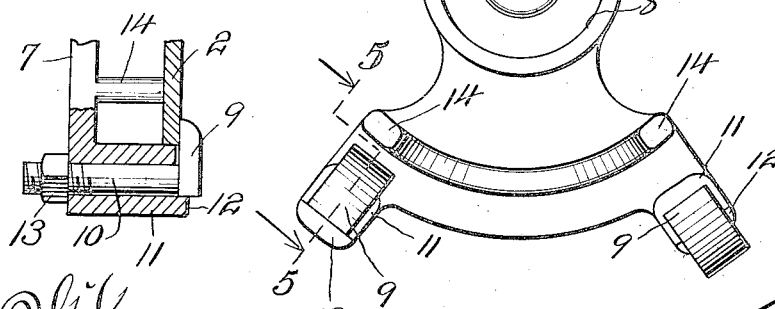
Witness:
J. P. Britt
Inventor
T. H. Jacob
By Geo W Young
Attorney

UNITED STATES PATENT OFFICE.

THOMAS H. JACOB, OF WAUSAU, WISCONSIN.

SUPPLEMENTAL AXLE FOR AUTOMOBILES.

1,278,669.

Specification of Letters Patent.   Patented Sept. 10, 1918.

Application filed June 8, 1917.   Serial No. 173,501.

*To all whom it may concern:*

Be it known that I, THOMAS H. JACOB, a citizen of the United States, and resident of Wausau, in the county of Marathon and State of Wisconsin, have invented certain new and useful Improvements in Supplemental Axles for Automobiles; and I do hereby declare that the following is a full, clear, and exact description thereof.

My invention relates to a device for providing a supplemental axle for an automobile when the axle thereof has been broken or damaged, and while it is especially adapted for use in connection with Ford cars, it will be at once appreciated that the same may be used for any make of car.

The primary object of my invention is to provide a supplemental axle for an automobile which will have means for securely retaining the same in position, and means for providing an axle or spindle for a supplemental wheel.

With the above and other objects in view, which will appear as the description proceeds, my invention resides in the novel construction, combination and arrangement of parts, substantially as hereinafter described, and particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles of my invention, in which:

Fig. 3 is a sectional view taken on the line indicated by line 3—3 of Fig. 4.

Fig. 4 is an elevational view of my invention looking in the direction indicated by the arrows of Fig. 3, and Fig. 5 is a sectional view taken on the line 5—5 of Fig. 4.

Figure 1:
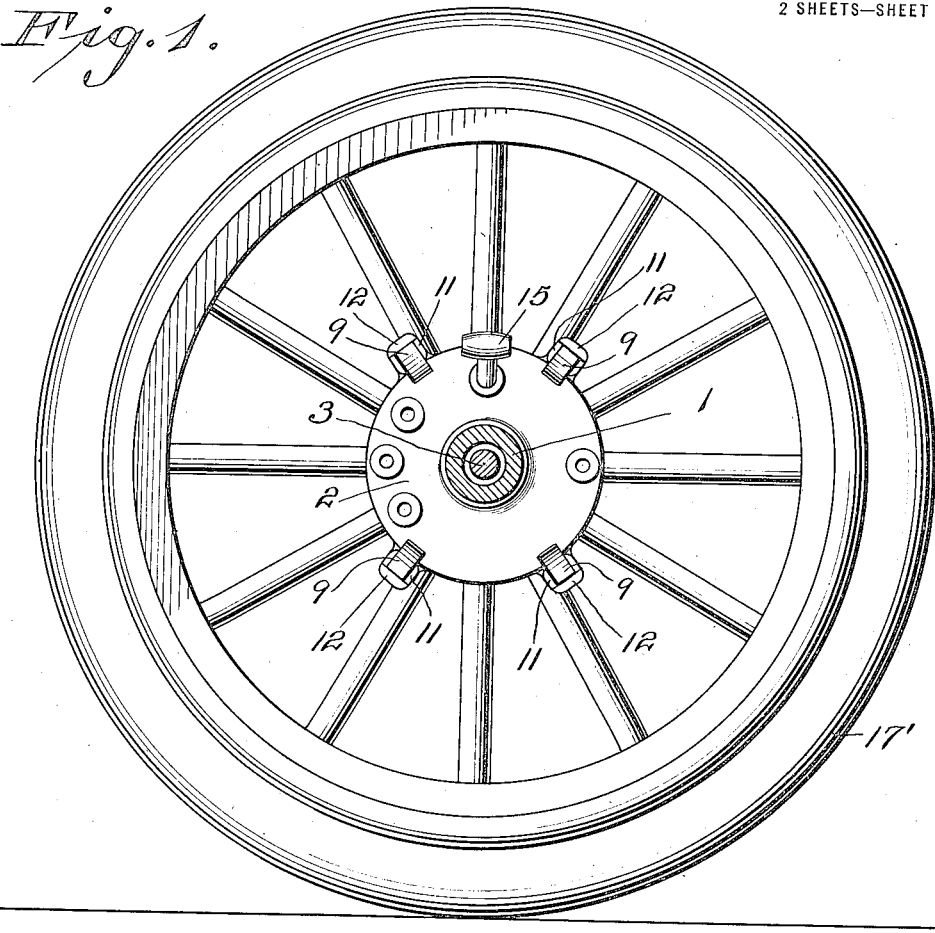
Figure 1 is a view taken on the line indicated by line 1—1 of Fig. 2.

Referring now more particularly to the drawings in which similar reference characters designate like parts throughout the several views of drawings, the numeral 1 represents the rear axle housing of an automobile which has mounted upon the end thereof a radial flange 2 generally employed for shielding the braking mechanism.

The different ways in which my invention may be used are numerous, and for the purpose of illustration, it will be assumed that one axle of the automobile, as indicated at 3, has been bent or so damaged as to render the same inoperative, and in order to tow the machine, with least trouble, to a garage, my invention is employed, which consists of a hollow supplemental axle 4, being provided with the ball bearing race surfaces 5, and the outer threaded portion 6, and having its inner end provided with a flange or plate and with a socket 8 adapted to fit over a portion of the housing 1 that projects beyond the flange 2.

The socket 8 is adapted to have a snug but removable fit upon the end of the housing 1, and to retain the same thereon, heads 9 are provided formed upon bolts 10 engaging the ears 11 formed integrally with the plate 7, the ears 11 each being formed with a shouldered or raised portion 12 adapted to prevent the head from turning when the binding nuts 13 are being tightened, as will be readily seen by reference to Figs. 3, 4, and 5.

Figure 2:
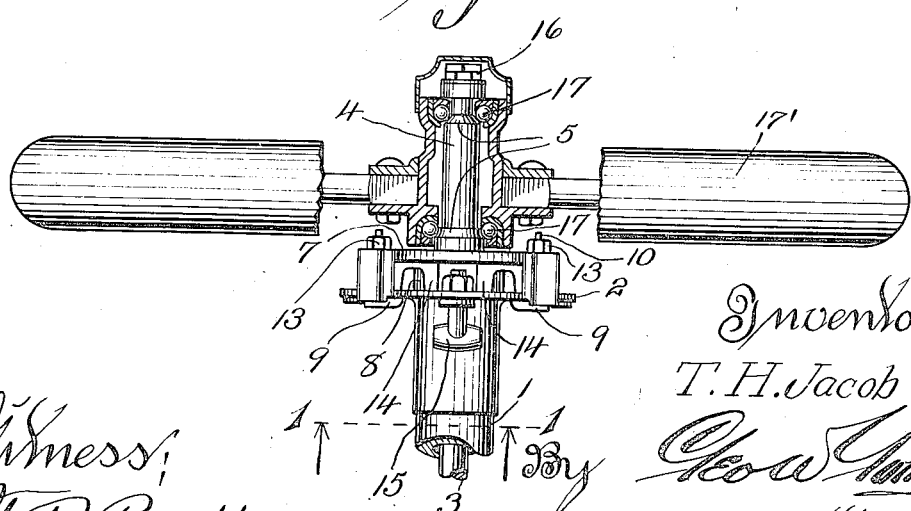
Fig. 2 is a sectional view through the hub of the supplemental wheel, the spindle or axle attachment being shown in full lines as secured to one end of the rear axle housing of an automobile.

These heads 9 engage the plate 2, as shown in Figs. 1, 2, and 5, and for spacing the plate 7 from flange 2, spacing lugs 14 are provided extending outwardly from the face of the plate 7, certain of these lugs 14 being farther apart than others to permit clearance of the securing bolt of the spring shackle 15, as generally employed in Ford cars.

Secured upon the axle 5 by means of nuts 16 is a supplemental wheel 17 of the usual automobile wheel type having ball bearings 17 tracking upon ball races 5, as clearly shown in Fig. 2.

Thus it will be understood from the foregoing description taken in connection with the accompanying drawings, that I provide a useful device, which when any one or two axles of a machine have become damaged, or for some reason or other inoperative, may be employed to permit ready towing of the car to a repair shop, as it will be obvious.

What is claimed is:

1. The combination with a vehicle axle housing having a radial flange at one end, of a supplemental axle therefor comprising a spindle, a radial plate formed at the inner end of the spindle and adapted to be disposed in juxtaposition to said radial flange, laterally extending spaced lugs extending from the plate to engage the radial flange and space the former from the latter, and means carried by the plate for engagement with the flange to hold the supplemental axle thereto.

2. The combination with a vehicle axle housing having a radial flange at one end, of a supplemental axle therefor comprising a spindle, a radial plate formed at the inner end of the spindle and adapted to be disposed in juxtaposition to said radial flange, spaced ears extending from said plate, each of said ears being shouldered, a bolt extending through each of said ears, a head on each of said bolts for engaging over the flange to hold the supplemental axle thereto, said heads being engaged with the shoulders of said ears to hold the bolts against rotation, and nuts on the shanks of the bolts to draw the plate toward said flange.

3. The combination with a vehicle axle housing having a radial flange at one end, of a supplemental axle therefor comprising a spindle, a radial plate formed at the inner end of the spindle and adapted to be disposed in juxtaposition to said radial flange, spaced ears extending from said plate and disposed outwardly of the periphery of said radial flange, each of said ears being shouldered, laterally extending spaced lugs projecting from the plate and disposed inwardly of the periphery of said radial flange, a bolt extending through each of said ears, a head on each of said bolts for engagement with one face of the radial flange, said laterally extending spaced lugs being engaged with the other face thereof, said heads being in contact with the shoulders of said ears to hold the bolts against rotation, and nuts on the shanks of the bolts whereby to tightly engage said radial flange between said heads and the laterally extending spaced lugs.

4. A device of the character described comprising a hollow spindle adapted to receive therein an automobile axle, a plate and a socket carried by the inner end of said spindle, said socket being adapted to have a snug fit over the end of an automobile axle housing, means carried by said plate for engaging a portion of said housing to retain the device in position, and means formed on the inner face of said plate for spacing and positioning the device with respect to said axle housing, substantally as described.

In testimony that I claim the foregoing I have hereunto set my hand at Wausau, in the county of Marathon and State of Wisconsin.

THOMAS H. JACOB.